United States Patent [19]

Tachi et al.

[11] Patent Number: 4,798,174
[45] Date of Patent: Jan. 17, 1989

[54] COLLAR FOR A PET

[75] Inventors: Yoshiya Tachi, Kuwana; Noriyuki Hotta, Ikoma, both of Japan

[73] Assignee: Hotta Co., Ltd. (Hotta Kabushiki Kaisha), Osaka, Japan

[21] Appl. No.: 63,213

[22] Filed: Jun. 17, 1987

[30] Foreign Application Priority Data

Apr. 10, 1987 [JP] Japan .................. 62-55062[U]

[51] Int. Cl.$^4$ ............................................. A01K 27/00
[52] U.S. Cl. .................................................. 119/106
[58] Field of Search ............... 119/106, 109; 66/192, 66/170

[56] References Cited

U.S. PATENT DOCUMENTS 1,185,933  6/1916  Powell ..................... 66/170
4,178,879 12/1979  Cunningham ............. 119/106

FOREIGN PATENT DOCUMENTS 8400666  3/1984  PCT Int'l Appl. ......... 119/106

Primary Examiner—Robert Peshock
Attorney, Agent, or Firm—Wenderoth, Lind & Ponack

[57] ABSTRACT

A collar for a pet equipped at one end of a beltform collar with a buckle having a pin, said proper being formed by a warp knitted fabric, preferably made by a double raschel stitch and having holes for inserting a pin which are formed by the gaps provided between a pair of chain stitches formed successively by a pair of adjacent warps not interlocking with each other in a given length.

4 Claims, 2 Drawing Sheets

COLLAR FOR A PET

BACKGROUND OF THE INVENTION

1. Field of the Invention

The present invention relates to a collar for a pet such as a cat or a dog.

2. Prior Art

There have been provided collars equipped with a buckle having a pin at one end of a beltform collar proper heretofore. Said proper is provided with holes for inserting a pin. Most of such collars, however, are made of hides, braids or woven fabrics. Few of such collars made of knitting have been provided. Because, in view of the properties of knitted fabrics it is difficult to obtain a desired thickness in the collar proper suitable for using for a pet. In addition thereto, such a collar made of a knitting fabric is lacking in formal stability and uniformity and also deteriorates in strength and durability. Especially, it is difficult to form holes for inserting a pin. Even if formed, said holes can not avoid their strength reduction.

SUMMARY OF THE INVENTION

It is therefore an object of the present invention to provide a collar for a pet which is composed of a knitted fabric free from the above demerits and fully suitable for a collar for a pet.

A collar proper in accordance with the present invention is in the shape of a belt and composed of a texture of a warp knitted structure, for example, made by raschel stitch or double raschel stitch whereby a suitable thickness and formal stability and uniformity are obtained and especially a desirable strength is obtained in the lengthwise direction of said collar proper.

Holes for inserting a pin of a buckle may be formed by punching the collar proper, but it is not applicable because such holes reduce the strength of the collar proper of a knitted structure. Stitches of the knitted structure may be also used for holes for inserting a pin, which however necessitates making stitches larger than usual for inserting a pin. Such larger stitches cause the problem of strength reduction.

In view of the above, it has been studied to provide a collar proper of a knitted structure with holes which easily and firmly accept a pin without causing strength reduction of the proper.

In accordance with the present invention, holes for inserting a pin are then formed by gaps or spaces provided between a pair of chain stitches not interlocking with each other in a given length, which are formed by a pair of adjacent warps. Namely, the holes for inserting a pin are integrally formed when a collar proper is made of a warp knitted fabric.

As stated above, a collar proper in accordance with the present invention is composed of a warp knitted fabric, for example, made by raschel stitch or double raschel stitch and holes for inserting a pin of a buckle are made by means of a pair of chain stitches which are formed simultaneously in the course of forming a collar proper of a knitted fabric. Accordingly, in spite of its being a knitted article, the collar proper thus obtained has a suitable thickness, formal stability and uniformity. In addition, said collar proper has an efficient strength in the lengthwise direction and besides, it is easy to form the holes for a pin without causing a strength reduction of the proper.

DETAILED DESCRIPTION OF THE INVENTION

Figure 1:
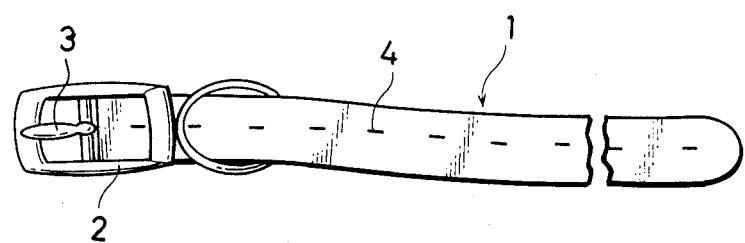
FIG. 1 is a plan view partially omitted showing a preferred embodiment of a collar in accordance with the present invention.

In FIG. 1, indicated by the reference numeral 1 is a beltform collar proper, 2 is a buckle equipped at one end of the said proper, 3 is a pin equipped at a buckle 2. The reference numeral 4 shows holes for inserting a pin 3 formed at a center portion of the collar proper 1 at regular distance in the lengthwise direction.

Figure 2:
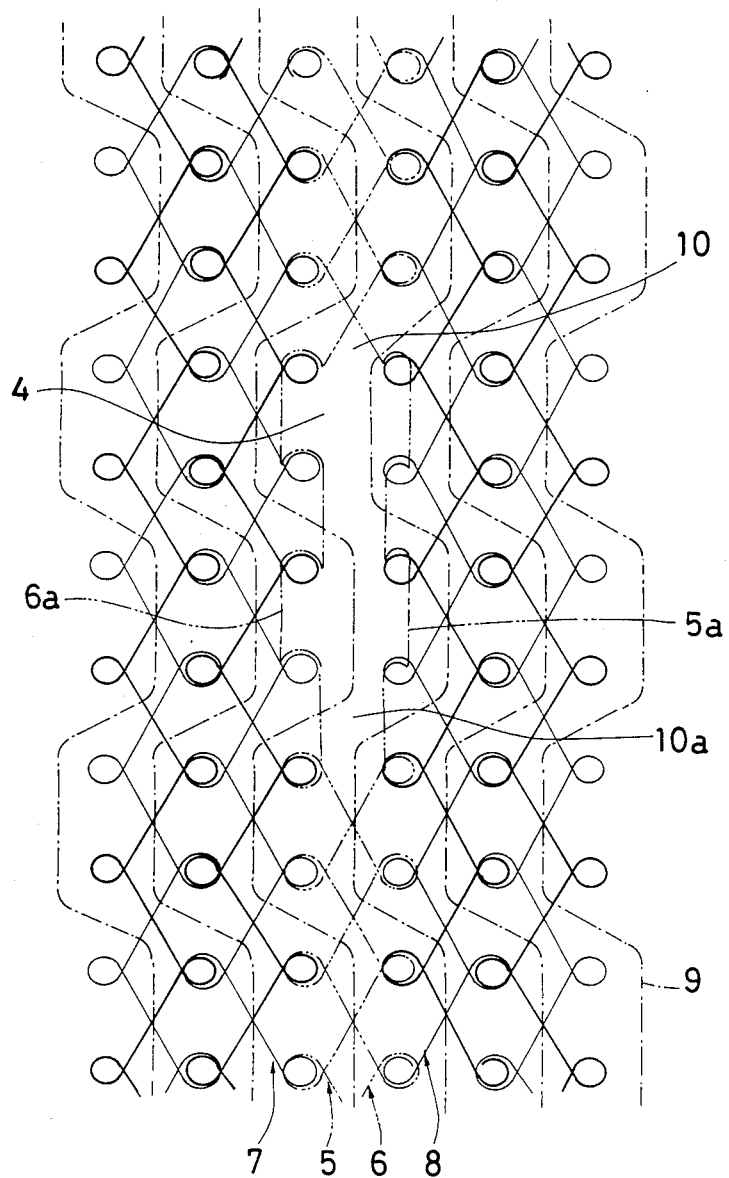
FIG. 2 is an enlarged schematic view showing the knitting structure in detail of the collar proper.

The collar proper 1 is composed of a warp knitted fabric successively woven lengthwise. As shown in FIG. 2, said proper in this embodiment is composed of a warp knitted fabric made by a double raschel stitch so as to obtain an appropriate thickness.

The holes for inserting a pin indicated by the reference numeral 4 are, as shown in FIG. 2, composed of a gap or a space formed between a pair of chain stitches 5a and 6a not interlocking with each other with a lengthwise dimension suitable for a hole for inserting a pin 3. Said chain stitches 5a and 6a are successively formed by a pair of adjacent warps 5 and 6 as shown in the drawing.

As shown in FIG. 2, said chain stitches 5a and 6a are interlocked respectively with warps 7 and 8 which are originally to be interlocked as wales of the knitted fabric so that the holes 4 for inserting a pin can maintain its formal stability and uniformity. In this embodiment, each loop is hooked to front and rear needles by means of a double raschel stitch machine for accomplishing the above objects.

Consequently, a collar in this embodiment has an appropriate thickness, and is therefore excellent in formal stability and uniformity, especially in strength in spite of a knitting structure.

Furthermore, for preventing the extension and improving the strength of said collar proper 1 in the lengthwise direction, in this embodiment a plurality of shogging threads 9 are inserted into the warp knitted fabric as shown in FIG. 2. The width of shogging in this embodiment is arranged so as to cover two courses at every wale of the knitted fabric, but there is no need to be restricted to this embodiment. From the viewpoint that the strength of the collar is required mainly in the lengthwise direction, it is preferable that the width of shogging is as narrow as possible.

On the other hand, it is preferable to arrange the width of shogging widely at the chain stitch starting portion 10 in order to improve the formal stability and the strength of a hole for inserting a pin in the lengthwise direction. In view of this, inserting another shogging thread or threads at a chain stitch starting portion 10 is preferable.

When a collar is used for a pet, especially for a cat and a dog, a remarkable local power is imposed on a chain stitch starting portion 10a located in an opposite direction to a buckle, so it is preferable that a plurality of shogging threads are inserted additionally into this portion. In this case, a plurality of shogging threads and shogging threads of larger size are both suitable.

In this embodiment, shogging threads are arranged so as to be inserted into the knitted fabric, but sticking these shogging threads onto the knitted fabric is also applicable.

Regarding the method for producing a collar proper 1 of a knitted fabric, the double raschel stitch as described in the embodiment is most preferable. It can be also constructed by way of the raschel stitch or sticking two sheets of knitted fabric made by single stitch.

The length of the holes 4 for inserting a pin can be adjusted by varying the length of the chain stitch. In this embodiment, the holes 4 are provided in a line with regular intervals in the lengthwise direction, but it may be also applicable to form the holes in two lines constructed by two pairs of chain stitch.

We claim:

1. A collar for a pet comprising:
   a belt-like collar proper, said collar proper having first and second ends, said collar proper being a warp-knitted fabric, said warp-knitted fabric having a plurality of only substantially unidirectional threads, at least one pair of said plurality of only substantially unidirectional threads being a pair of hole-defining chain stitches, each thread of said pair of hole-defining chain stitches being alternately interlocked and noninterlocked with the other thread of said pair of hole-defining chain stitches for defining a plurality of interlocked and noninterlocked segments along the length of said belt-like collar proper, each hole of said plurality of holes being defined by a non-interlocked segment of said plurality of interlocked and noninterlocked segments of said pair of hole-defining chain stitches;
   a buckle attached at said first end of said belt-like collar proper; and
   a pin having first and second ends, said first end of said pin being attached to said buckle, said second end of said pin being insertable into each said hole of said plurality of holes defined by said pair of hole-defining chain stitches.

2. A device as in claim 1, wherein said warp-knitted fabric includes a plurality of double raschel stitches.

3. A device as in claim 1, wherein said warp-knitted fabric includes a plurality of only substantially unidirectional shogging threads.

4. A device as in claim 3, wherein at least one of said plurality of only substantially unidirectional shogging threads is directly adjacent at least one thread of said pair of hole-defining chain stitches for reinforcing said plurality of holes defined by said pair of hole-defining chain stitches.

* * * * *